United States Patent [19]

Korn

[11] Patent Number: 5,781,198
[45] Date of Patent: Jul. 14, 1998

[54] METHOD AND APPARATUS FOR REPLACING A BACKGROUND PORTION OF AN IMAGE

[75] Inventor: Rodney A. Korn, Hillsboro, Oreg.

[73] Assignee: Intel Corporation, Santa Clara, Calif.

[21] Appl. No.: 577,503

[22] Filed: Dec. 22, 1995

[51] Int. Cl.⁶ .................................................. G06F 15/00
[52] U.S. Cl. .................................................. 345/435
[58] Field of Search ............................. 395/135, 137; 345/113, 114

[56] References Cited

U.S. PATENT DOCUMENTS

| | | | |
|---|---|---|---|
| 4,602,286 | 7/1986 | Kellar et al. | 358/183 |
| 5,216,755 | 6/1993 | Walker et al. | 395/132 |
| 5,258,836 | 11/1993 | Murata | 358/136 |
| 5,353,063 | 10/1994 | Yagisawa et al. | 348/426 |
| 5,519,436 | 5/1996 | Munson | 348/19 |
| 5,594,850 | 1/1997 | Noyama et al. | 395/135 |

FOREIGN PATENT DOCUMENTS

0 181 237  11/1985  European Pat. Off. .

*Primary Examiner*—Phu K. Nguyen
*Attorney, Agent, or Firm*—Blakely, Sokoloff, Taylor & Zafman

[57] ABSTRACT

An image processing system for removing and replacing the background portion of an image with a replacement background image. The image processing system receives an actual background image and a current image. The current image includes a foreground portion and a background portion. The background portion of the current image includes at least a portion of the actual background image. An image mask is generated representing the similarities and differences between the actual background image and the current image. A new image is generated in response to the image mask and contains portions of the current image and portions of the replacement background image.

23 Claims, 11 Drawing Sheets

METHOD AND APPARATUS FOR REPLACING A BACKGROUND PORTION OF AN IMAGE

BACKGROUND OF THE INVENTION

1. Field of the Invention

The present invention relates to image processing systems. More specifically, an image processing system for removing and replacing the background portion of an image with a different background.

2. Background

Various types of image processing systems exist for creating, editing, and displaying images. These systems typically include a camera or other device capable of capturing or storing an image. An image processing system is used to edit or enhance the captured image which is then stored on a storage device or displayed on a display device. Additionally, the image may be partially or entirely computer-generated; i.e., created by a computer system, rather than capturing an actual image.

A particular problem arises when the background portion of an image must be changed while maintaining the foreground portion of the image unchanged. This procedure may be referred to as "background replacement." In many instances, background replacement must be performed in real time. For example, the background portion of a stream of images received in real time may be replaced with a different background without changing the foreground image.

A known technique for removing a background portion of an image is commonly referred to as "blue screening." The blue screening process positions the foreground image, such as a person or object, in front of a screen having a uniform color, such as blue. For this technique to work properly, the screen must be a known, uniform color. Additionally, the color must be significantly different from any dominant colors in the foreground portion of the image. During image processing, the background portions are identified by the uniform blue color, and can be removed. Thus, any image pixels having the same color as the known background are replaced with a different background pixel.

The above blue screening technique is well-suited for a video recording studio or other production facility. However, such a system is less practical in a typical consumer setting such as a home or an office. To perform the blue screening process in a home or office, it is necessary to install a screen having a uniform color, and provide proper lighting such that the uniform screen color is properly identified by the image processing system. The use of such a screen represents an expensive and complicated solution for home and office environments. In many instances, physical space limitations or insufficient lighting may prevent the use of blue screening in a home or office setting.

Even with an appropriate location and screen, problems may arise if any colors in the foreground portion of the image are similar to the uniform background color. In this situation, the image processing system may not be capable of distinguishing between the background and the foreground, resulting in improper background removal and replacement.

Therefore, it is desirable to provide an image processing system capable of removing and replacing any background portion of an image regardless of the color or uniformity of the background.

SUMMARY OF THE INVENTION

The present invention provides an image processing system for removing and replacing the background portion of an image with a different background. The image processing system can remove any stationary background from an image, regardless of the color or uniformity of the background. The image processing system is capable of performing real time background replacement.

One embodiment of the present invention provides a system for replacing a background portion of an image with a replacement background image. The system receives an actual background image and a current image. The current image includes a foreground portion and a background portion. The background portion of the current image includes at least a portion of the actual background image. An image mask is generated representing the similarities and differences between the actual background image and the current image. A new image is generated in response to the image mask and contains portions of the current image and portions of the replacement background image.

Another feature of the present invention provides for convolving the actual background image and convolving the current image. Additionally, the image processing system convolves the image mask to generate a convolved image mask.

Another aspect of the invention determines a mask threshold value for comparing the actual background image to the current image. Other features of the present invention include applying the image mask simultaneously to the current image and the replacement background image.

Another aspect of the present invention provides a series of individual background images used in a predetermined order to generate the replacement background image.

Other embodiments of the invention provide a system for removing a background portion of a current image and generating a new image containing only the foreground portion of the current image.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the present invention. However, those skilled in the art will appreciate that the present invention may be practiced without these specific details. In other instances, well known methods, procedures, components, and circuits have not been described in detail so as not to obscure the present invention.

The present invention is related to an image processing system for removing and replacing the background portion of an image with a different background. This system is capable of removing any stationary background from the image regardless of the color or uniformity of the background. The background may be removed from a stream of images in real time, thereby allowing for real time background replacement. However, the invention is not limited to real time processing and may be applied to any image processing system. Any replacement background may be used to replace the background portion of the image captured by the image processing system.

The present invention may be used in various applications where background removal or replacement is desired. For example, in a video teleconferencing system, a conference participant working at home can replace the home background with a background that resembles the participant's office at work. The present invention may also be used in security systems to identify items removed from a background image and to identify the person removing the items. Additionally, the present invention can be used to replace an actual background image with an animated background. Various types of video clips or image segments can be created using the present image processing system. These applications of the present invention are provided as examples only and do not represent an exhaustive list of potential applications of the invention.

Figure 1:
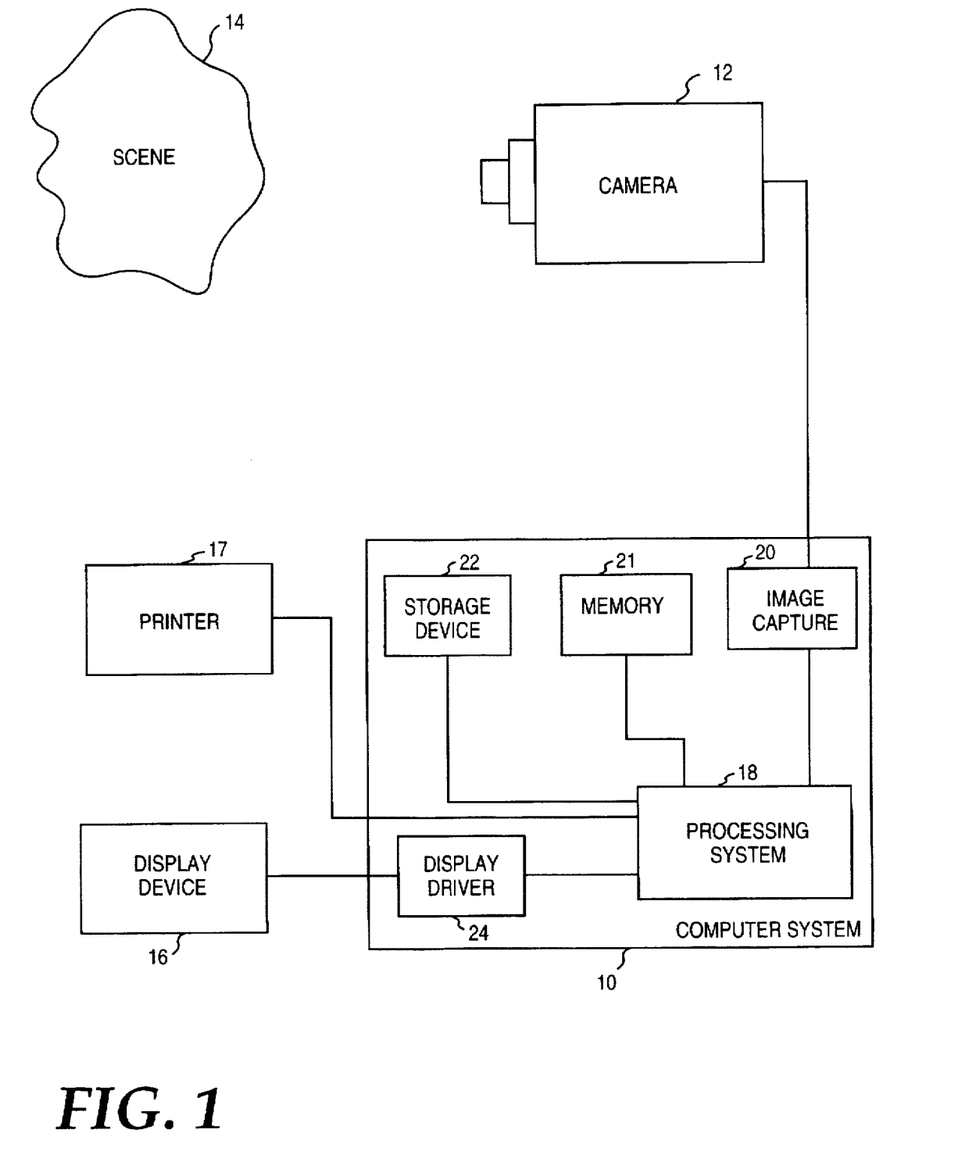
FIG. 1 is a block diagram of an image processing system for use with the present invention.

Referring to FIG. 1, a block diagram illustrates an image processing system capable of implementing the present invention. A computer system 10 is connected to a camera 12 and a display device 16. A printer 17 may be connected to computer system 10 for printing images generated by the computer system. Printer 17 is optional and may be used in addition to display device 16, or may replace display device 16. Computer system 10 may be a personal computer, a dedicated image processing system, or any other device capable of performing image processing functions. Additionally, computer system 10 may be incorporated into either camera 12 or display device 16. In a specific embodiment of the present invention, computer system 10 is a personal computer performing image processing functions as well as other tasks. Camera 12 may be any type of camera or other device capable of capturing images, such as the image provided by scene 14. Display device 16 may be a computer monitor or any other device capable of displaying images.

In a specific embodiment, computer system 10 is a personal computer having a processing system 18, a memory 21, and a storage device 22, such as a disk drive. Memory 21 is used for temporary storage of images and image masks generated by processing system 18, and is particularly useful with real time processing of images. Storage device 22 can be used for permanent as well as temporary storage of various images, image masks, and other data generated by the image processing system. An image capture device 20 receives the image provided by camera 12 and transforms the image data into signals readable by processing system 18. When used with a personal computer, image capture device 20 may be an image capture board inserted into the personal computer system. A display driver 24 is coupled between processing system 18 and display device 16 and transforms the signal provided by the processing system into a signal which can be received by the display device. Display driver 24 may be a hardware device or a software routine executed by processing system 18. Additionally, memory 21, storage device 22, image capture device 20, and display driver 24 may be coupled to processing system 18 (as shown in FIG. 1) or contained within processing system 18.

Figure 2:
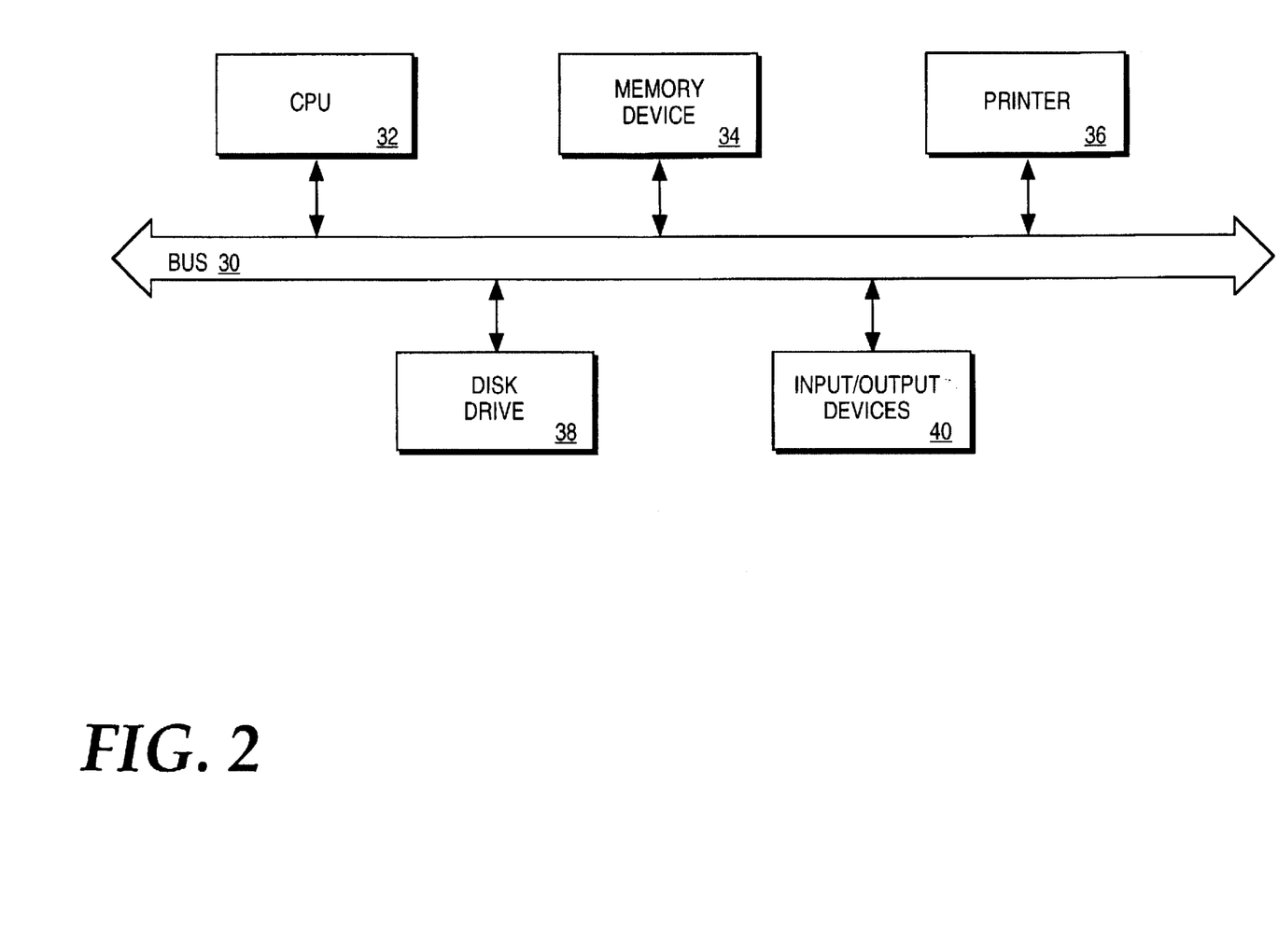
FIG. 2 is a block diagram of a known computer system.

FIG. 2 illustrates a block diagram of a general computer system. A bus 30 transmits data and commands between a CPU 32, a memory device 34, a printer 36, a disk drive 38, and input/output devices 40. The computer system illustrated in FIG. 2 may be used as the processing system 18, illustrated in FIG. 1. Those skilled in the art will appreciate that various computer systems, cameras, and display devices may be used to practice the present invention.

Figure 3:
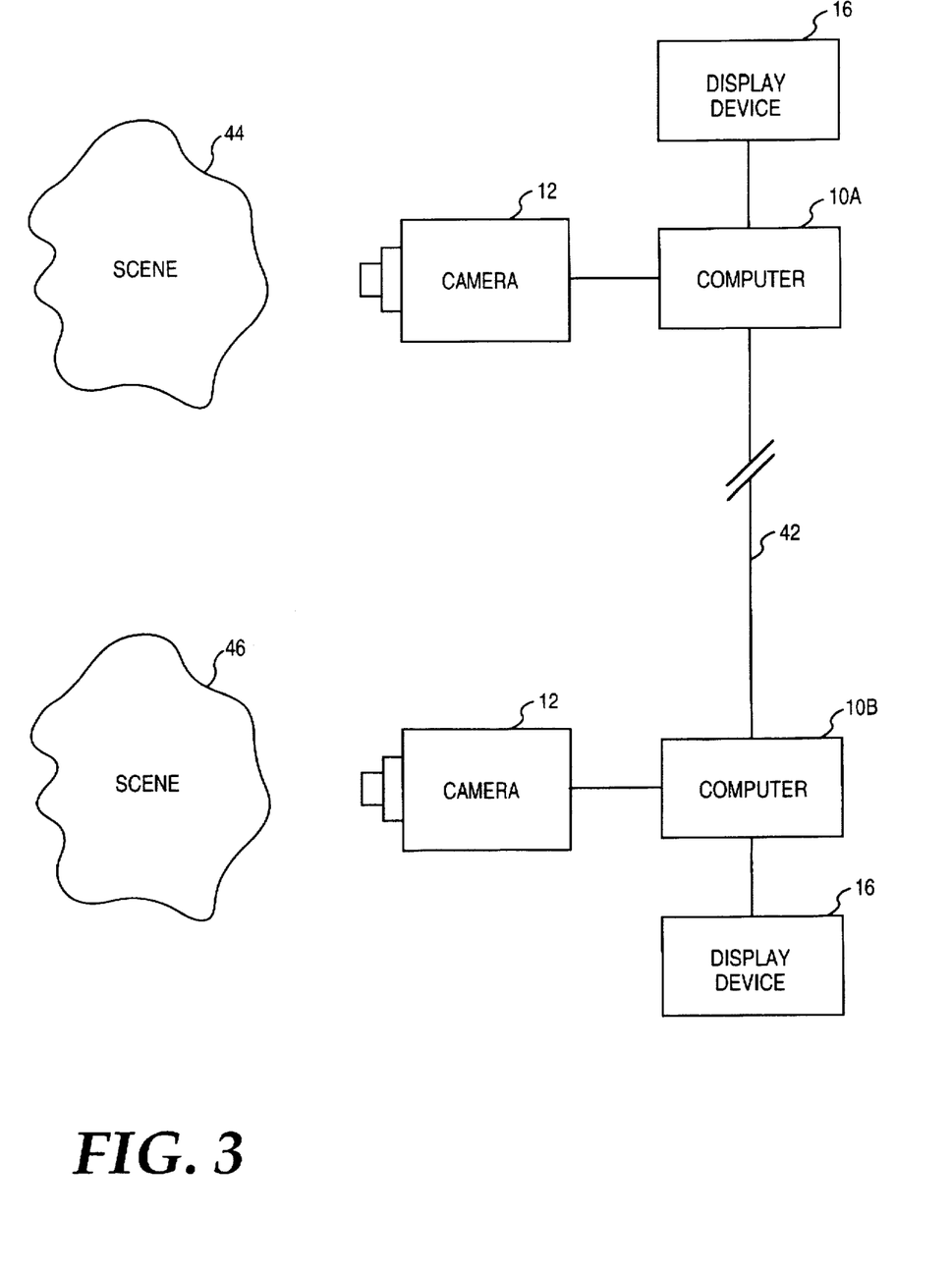
FIG. 3 is a block diagram showing various components and connections in a video teleconferencing system.

Referring to FIG. 3, a block diagram illustrates various components and interconnections in a video teleconferencing system. Two separate computer systems 10A and 10B are provided, each having an attached camera 12 and display device 16. The two computers 10A and 10B are connected using a link 42. Link 42 may be a telephone connection, a network connection, a hardwired connection, a radio-frequency link, or any other link used to transmit information between two computer systems. Each computer system 10A, 10B uses camera 12 to view a particular scene. The camera in the first image processing system views scene 44 and the camera in the second image processing system views scene 46. Thus, computer system 10A receives an image representing scene 44. Computer system 10A then processes the image data and transmits the image across link 42 to computer 10B for display on its attached display device 16. Similarly, computer 10B receives an image representing scene 46, processes that image, and transmits the image across link 42 to computer 10A for display on its display device 16. The processing performed by each computer 10A and 10B varies depending on the requirements and capabilities of the video teleconferencing system.

In the teleconferencing system of FIG. 3, image processing may be performed by either or both computer systems 10A and 10B. For example, computer system 10A may replace the background portion of scene 44 and transmit the new image, including the replacement background, to computer system 10B for display. Similarly, computer system 10B may perform background replacement processing on scene 46 and transmit the new image to computer system 10A for display. Alternatively, computer system 10A may transmit the current image as well as the replacement background image to computer system 10B for processing. Computer system 10B may then transmit its current image and replacement background image to computer system 10A for processing. Thus, each computer system performs the background replacement processing for the image captured by the other computer system.

Furthermore, an embodiment of the present invention allows each conference participant to select the replacement background displayed on their local display device 16. For example, the conference participant using computer system 10A may select the replacement background to be used with the current image captured and transmitted from computer system 10B to system 10A. Similarly, the conference participant using computer system 10B may select the replacement background used with the image transmitted from system 10A to 10B. Thus, each conference participant is able to control the background they observe during the conference on the local display device.

Another embodiment of the present invention provides a teleconferencing system where all image processing is performed by a single computer system, such as computer system 10B. In this situation, computer system 10B performs the background replacement for scene 44 and displays the new image on its display device 16. Similarly, computer system 10B performs background replacement for scene 46 and transmits the new image to computer system 10A for display.

Figure 4:
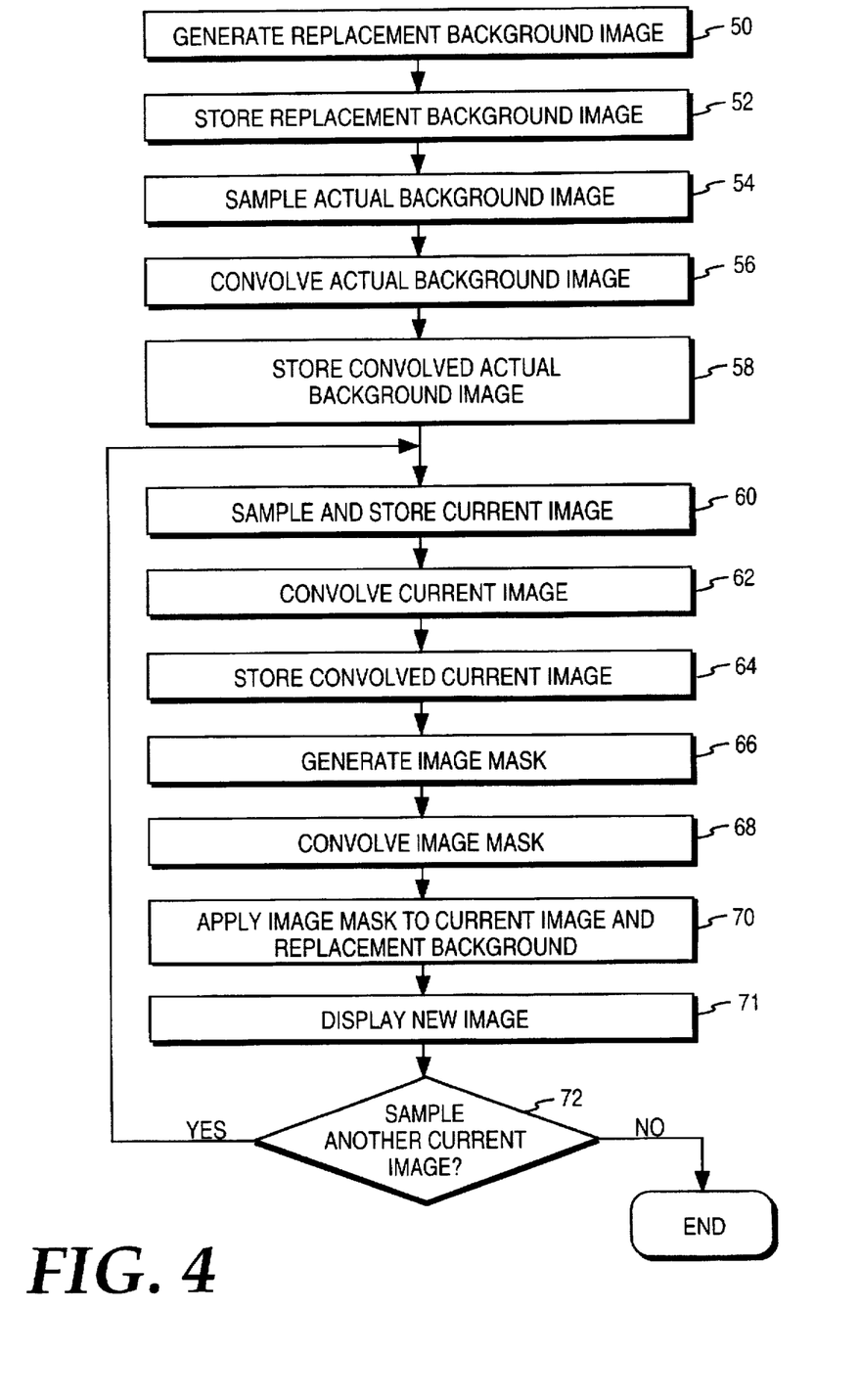
FIG. 4 is a flow diagram illustrating the overall operation of the present invention.
Figure 5A:
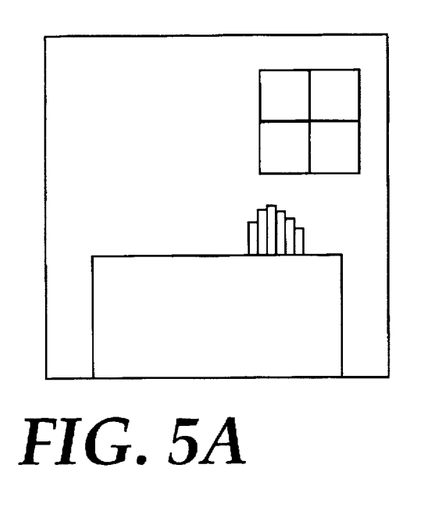
FIGS. 5A–5D illustrate various images received and generated by the image processing system.
Figure 5B:
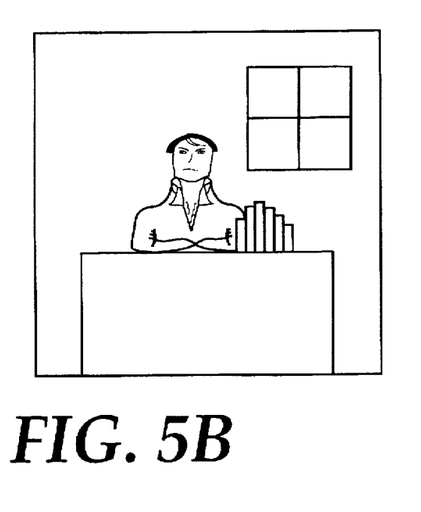
Figure 5C:
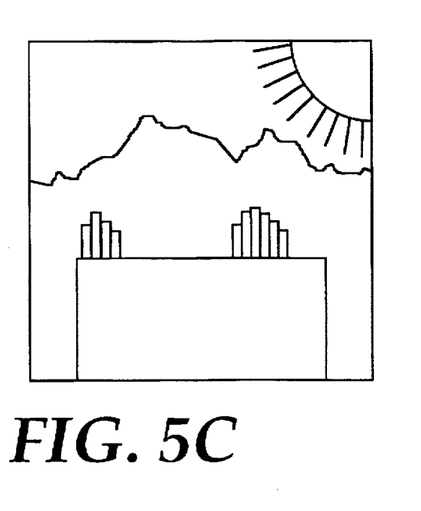
Figure 5D:
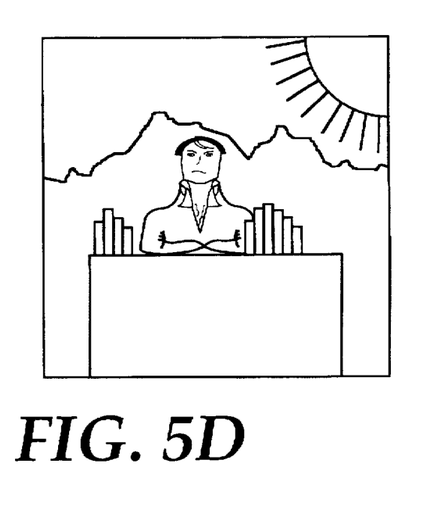

Referring to FIG. 4, a flow diagram illustrates the overall operation of the image processing system. The steps performed in FIG. 4 will be described with respect to FIGS. 5A–5D, which illustrate various images received and generated by the image processing system. In particular, FIG. 5A illustrates an actual background image to be removed or replaced by the image processing system. The image in FIG. 5A is a home or office setting having a desk, books, and a window. FIG. 5B illustrates a current image sampled by the image processing system. The image in FIG. 5B includes a background portion corresponding to FIG. 5A and a foreground portion (the person sitting at the desk). FIG. 5C represents a replacement background image to replace the actual background image. The image in FIG. 5C is an outdoor setting having mountains and the sun. FIG. 5C also includes a desk and books similar to that of FIG. 5A, but includes additional books on the opposite side of the desk. FIG. 5D represents the newly generated image having the same foreground portion as the current image, but the home/office background has been replaced with the background of FIG. 5C having mountains and the sun.

Thus, as described with respect to FIGS. 5A–5D the background portion of an image is the portion which is stationary and not changing. The foreground portion of an image is the portion which has changed since the actual background image was sampled. The foreground and background portions, as discussed in this specification, do not necessarily have any predetermined physical relationship to one another.

In FIG. 4, at step 50, a replacement background image is generated. FIG. 5C illustrates an example of a replacement background image including mountains and the sun. This replacement background image may be generated by capturing an image using a camera or other image capturing device. Additionally, the replacement background image may be a computer-generated image, or a combination of both an actual image and computer-generated images or objects within the actual image. In FIGS. 5A–5D, the replacement background image is used to transform a typical home or office setting having a rear wall with a window into a more attractive mountain landscape as the background.

At step 52, the replacement background image generated at step 50 is stored for future use by the image processing system. The replacement background image may be stored on a permanent storage device such as a disk drive or may be stored in a memory device coupled to the image processing system. At step 54, an actual background image is sampled. FIG. 5A illustrates an example of an actual background image. When sampling the actual background image at step 54, the foreground portion of the image cannot be present. In the example provided in FIGS. 5A–5D, the person sitting at the desk is the foreground image. Therefore, to generate the actual background image (the desk, books, and window), the person must move away from the desk and other background objects. After the actual background has been sampled, the person or other foreground objects may be replaced.

After the actual background image has been sampled, the image is convolved at step 56. The actual background image is convolved to eliminate jitters in the image caused by the camera and any fluorescent lighting of the scene. The convolution process acts as a low pass filter which "smoothes" the image data. The convolution process creates a blurred version of the actual background image by averaging each pixel value with the values of the surrounding pixels. Additional details regarding the convolution process are provided below with respect to FIGS. 6 and 7.

At step 58, the convolved actual background image is stored on a storage device or memory device, as discussed above. Next, the current image is sampled and stored at step 60. An example of a current image is illustrated in FIG. 5B, and includes both the background portion of the image illustrated in FIG. 5A and the foreground portion of the image; i.e., the person sitting at the desk. At step 62, the current image is convolved using a procedure similar to that described in step 58 when convolving the actual background image. Similar convolving procedures are used to provide accurate comparisons between the convolved actual background and the convolved current image. Additional details regarding the convolution process and comparisons of various images are provided below.

At step 64, the convolved current image is stored by the image processing system, as described above. The convolved current image must be stored until an image mask has been generated. Since the image processing is performed in real time, the convolved current image is stored for a relatively short period of time. Therefore, a memory area within the image processing system is best utilized for storing the convolved current image.

At step 66, an image mask is generated by comparing each pixel of the convolved actual background image with each corresponding pixel of the convolved current image. The image mask is a two-dimensional array of bits. Each bit in the image mask indicates whether the corresponding bits in the actual background image and the current image were substantially similar or different. A similarity between the actual background image and the current image indicates a background portion and a difference between the images indicates a foreground portion. Additional details regarding generation of the image mask are provided below with respect to FIGS. 8 and 9.

After the image mask has been generated at step 66, the routine continues to step 68 where the image mask is convolved. The convolving procedure used with the image mask is different from the procedure used to convolve the actual background image and current image described above. Additional details regarding the convolving process as applied to the image mask are provided below with respect to FIGS. 10 and 11.

After the image mask has been convolved, the image mask is applied to the current image and the background image at step 70 to generate a new image. The new image is then displayed at step 71. Note, the new image includes portions of the current image as actually sampled rather than the convolved current image. The convolved current image is used to generate the image mask, and is not part of the new image itself. Additional details regarding this image generation procedure are provided below in FIG. 12. The new image is displayed on a display device, such as display device 16 in FIGS. 1 and 3. Alternatively, the new image may be stored on a storage device, such as a disk or tape, for display at a later time. An example of a new image having a replacement background image is illustrated in FIG. 5D.

After the new image has been generated and displayed at step 70, step 72 determines whether another current image should be sampled. If additional samples are required, the routine branches to step 60 to sample another current image. If additional images are not required, the background replacement procedure ends.

As illustrated in FIG. 4, steps 50–58 are performed once for a particular image processing session. Thus, a stream of current images are sampled without altering the convolved actual background or the replacement background image. Only the current image convolution step and the mask creation and convolution steps are repeated for each sampled current image.

The procedure described above provides image processing using a single replacement background image. However, the present invention can also be used to perform background replacement using a series of different replacement background images. Thus, an animated replacement background can be generated by sequencing through the series of background images. Additionally, the replacement background image may be a randomly-generated pattern or design. The same pattern or design can be applied to each captured image, or may be determined randomly for each image captured. Furthermore, the replacement background may change periodically, for example, after a time period has elapsed or a particular number of images have been captured. Therefore, a variety of different background replacement techniques may be used with the present invention.

Figure 6:
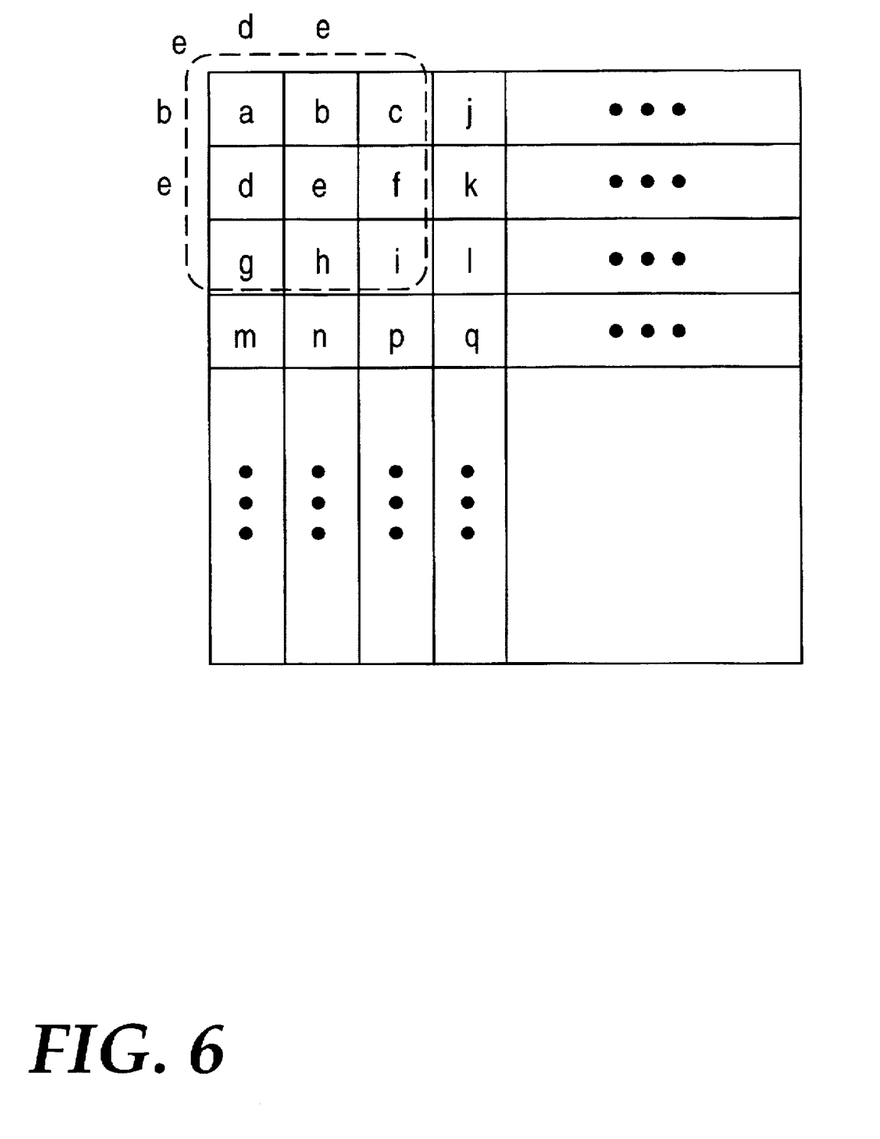
FIG. 6 is a pixel diagram illustrating a convolution procedure used in accordance with the invention.

FIG. 6 illustrates a plurality of pixels arranged into rows and columns to generate an image. For clarity purposes, only sixteen pixels in the upper left corner of the image are shown. As discussed above with respect to FIG. 4, the actual background image and the current image are convolved at steps 58 and 62 to reduce jitters and smooth the images. The convolving process adds the values of the eight surrounding pixels and divides by eight to generate a new value for the pixel. The convolving process begins in the upper left corner of the image by convolving pixel a. Since pixel a is not surrounded by eight pixels, the existing pixels are "mirrored" as shown in FIG. 6 to derive eight surrounding pixel values. Pixels d and e are "mirrored" above pixels a and b, pixels b and e are "mirrored" to the left of pixels a and d, and pixel e is mirrored diagonally above and left of pixel a. Thus, the convolved value of pixel a is calculated using the following formula:

$$\text{convolved pixel } a = \frac{e+d+e+b+b+e+d+e}{8}$$

The new (convolved) value of pixel a is stored as part of the convolved image. The convolving process then continues across the row to pixel b, calculated using the following formula:

$$\text{convolved pixel } b = \frac{d+e+f+a+c+d+e+f}{8}$$

This procedure continues across the row to pixel c and all subsequent pixels until the row has been completed. When the first row of pixels is completed, the convolving process continues to the next row and convolves the pixels in the same manner. For example, the convolved value of pixel e is calculated using the following formula:

$$\text{convolved pixel } e = \frac{a+b+c+d+f+g+h+i}{8}$$

The convolving process then continues across the row until all pixels have been convolved. When all pixel rows have been convolved, the convolved image is complete.

Figure 7:
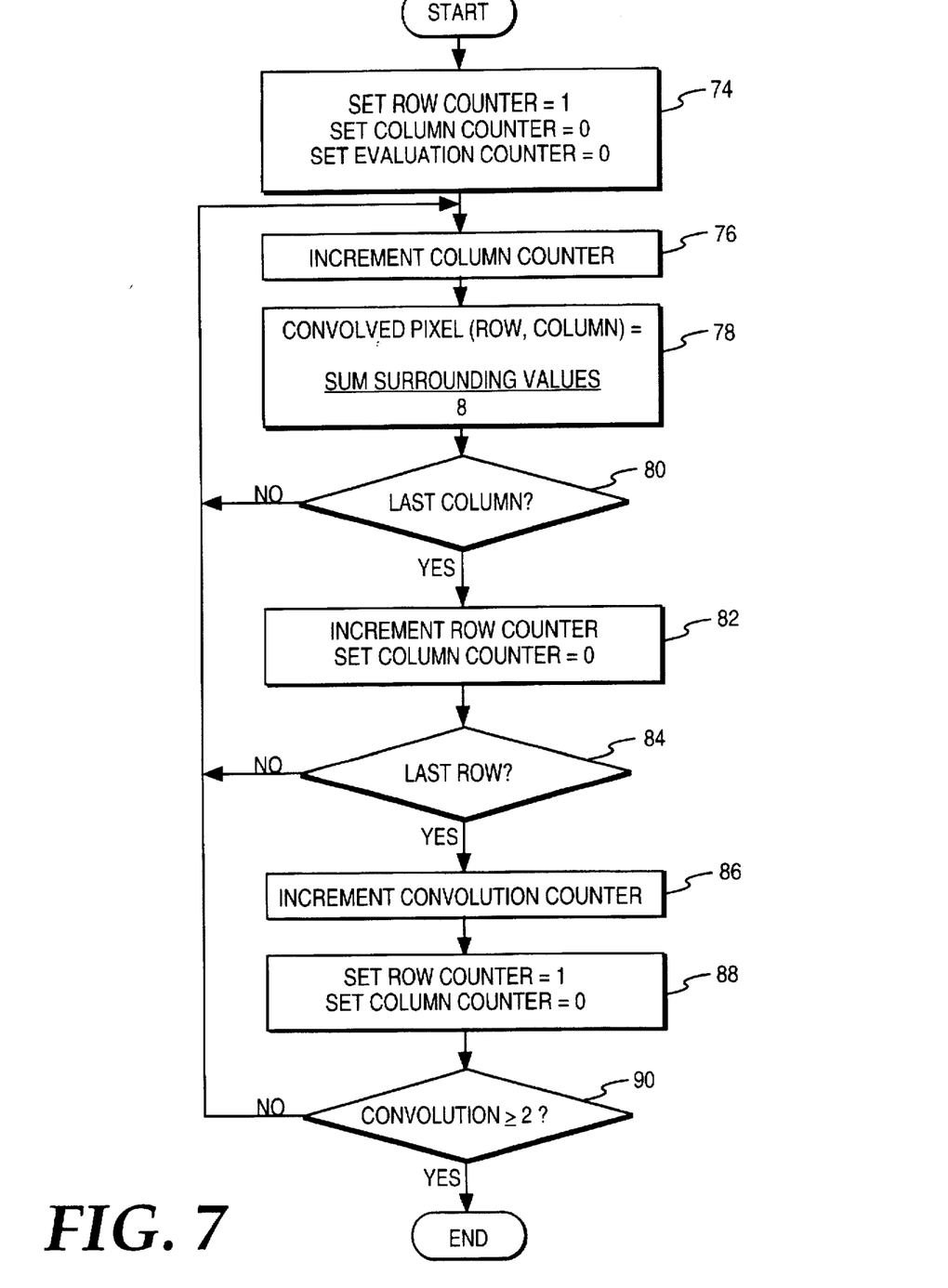
FIG. 7 is a flow diagram showing an image convolution procedure.

Referring to FIG. 7, a flow diagram provides a detailed illustration of the convolving process used to convolve the actual background image and the current image. At step 74, a row counter is set to 1, a column counter is set to 0, and a convolution counter is set to 0. At step 76, the column counter is incremented. At step 78, the pixel identified by the row and column counter is convolved by adding the values of the eight surrounding pixels and dividing by eight, as described above. Pixels along the edge of the image are not surrounded by eight pixels and, therefore, the "mirroring" process is used to derive the necessary surrounding pixel values.

Alternate methods may be used to calculate the value of the convolved pixel at step 78. For example, the eight surrounding values as well as the value of the pixel itself may be added together and divided by nine to determine the convolved pixel value. However, in the illustrative embodiment, the pixel being convolved is not added into the equation, such that the added values may be divided by eight rather than divided by nine. A typical computer system is more efficient when dividing by powers of two; e.g., dividing by eight is more efficient than dividing by nine. Therefore, the illustrative embodiment divides by eight rather than nine, to permit faster operation of the image processing system.

Alternate convolution methods include applying a particular weight to each of the surrounding pixels and dividing by the sum of the weighted values. For example, if convolving pixel e in FIG. 6, the four pixels immediately adjacent pixel e (pixels b, d, f, and h) may be assigned a weight of two. The four pixels diagonally adjacent pixel e (pixels a, c, g, and i) are assigned a weight of one. In this case, the weight of each pixel is multiplied by the value of the pixel before adding the pixels together. The sum of the surrounding pixels is then divided by the sum of the weights, in this case, twelve. This calculation is illustrated as follows:

$$\text{convolved pixel } e = \frac{2 \cdot (b+d+f+h) + a+c+g+i}{12}$$

Those skilled in the art will appreciate that various other methods may be used to convolve images, depending on the particular characteristics of the image being convolved and the results desired.

Referring again to FIG. 7, after the convolved pixel value has been determined at step 78, the routine continues to step 80 to determine whether the last column in the image has been reached. If the current column is not the last column, then the routine branches to step 76 to increment the column counter and convolve the next pixel. If the last column has been reached, the routine branches to step 82 to increment the row counter and set the column counter to 0. Next, the routine continues to step 84 to determine whether the last row of pixels has been convolved. If additional rows of pixels remain to be convolved, then the routine branches to step 76. If the last row of pixels has been convolved, then the routine branches from step 84 to step 86 where the convolution counter is incremented. Image processing which includes background replacement requires that the images are convolved such that a significant smoothing of the image occurs. To accomplish this, the convolution process is performed twice. First, the convolution process is performed on the actual background image or the current image to generate a convolved image. Next, the convolved image is convolved again, using the same procedures, to provide additional smoothing of the image. Therefore, the convolution counter is tested at step 90 of FIG. 7 to determine whether two convolution procedures have been completed. If less than two convolution procedures have been performed, the routine branches to step 76 to perform another convolution procedure. If two convolution procedures have been performed, the image convolution procedure terminates.

In another embodiment of the invention, the convolution process is performed once rather than twice, the calculation is as follows:

$$\text{convolved pixel} = \frac{2 \cdot (\text{sum of surrounding pixel values})}{16}$$

This calculation will produce similar results, but requires a single convolution of the image.

Figure 8:
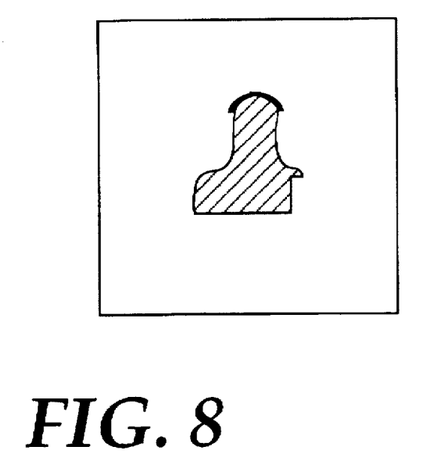
FIG. 8 illustrates an image mask generated by the image processing system.

Referring to FIG. 8, an image mask generated by the image processing system is shown. The image mask represented in FIG. 8 illustrates the differences and similarities between the actual background image shown in FIG. 5A and the current image shown in FIG. 5B. The differences between FIGS. 5A and 5B represent the foreground portion of the image. In this case, the foreground portion of the image is the person sitting at the desk. These foreground differences are illustrated in FIG. 8. Note that FIG. 8 does not illustrate the details of the foreground image, but merely identifies the foreground image as being different from the background image shown in FIG. 5A. The similarities between FIGS. 5A and 5B represent the background portion of the image. In this case, the background portion of the image is everything except the person sitting at the desk.

Figure 9:
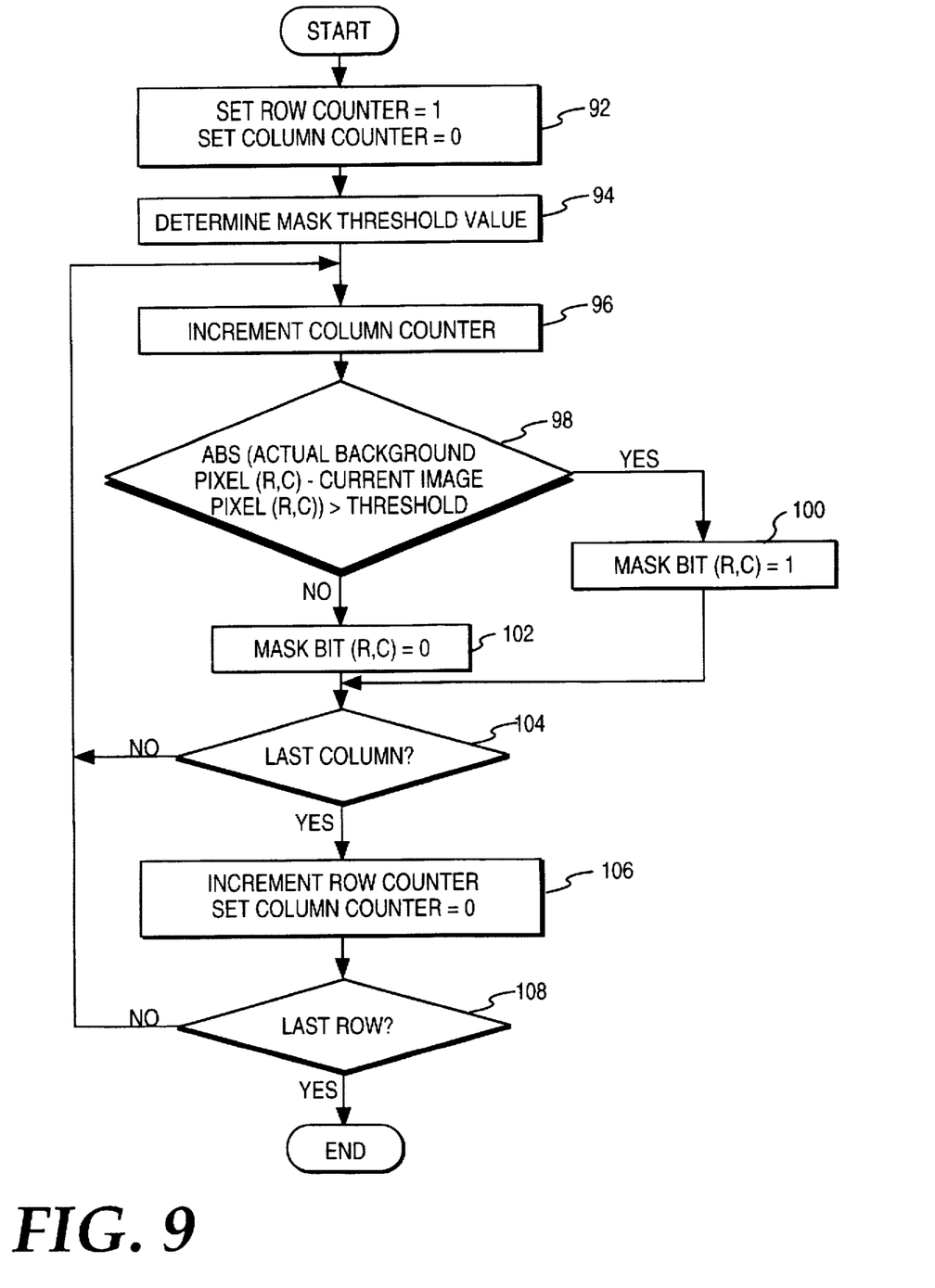
FIG. 9 is a flow diagram illustrating the procedure utilized to create an image mask.

Referring to FIG. 9, a flow diagram illustrates the procedure used to create the image mask shown in FIG. 8. In general, each pixel of the current image is compared to each corresponding pixel in the actual background image. The image mask generated is a two-dimensional bit map of ones and zeros. A one represents a difference between the actual background image and the current image, while a zero represents a similarity between the actual background image and the current image.

At step 92 of FIG. 9, a row counter is set to 1 and a column counter is set to 0. At step 94, a mask threshold value is determined and at step 96 the column counter is incremented. The mask threshold value determines the degree of difference required between the actual background image and the current image to register a difference between the pixels. This threshold value will vary depending on the image processing system and the results desired. For example, a low threshold value will identify smaller differences between the two images, therefore creating a greater likelihood that shadows, flickers and other "noise" will be detected as part of the foreground image. If detected as part of the foreground image, flickers and other noise will be copied into the new image. In contrast, a high mask threshold value may fail to detect certain portions of the foreground image which are not significantly different from the background image. Therefore, a mask threshold value is selected between these two extreme positions based on the particular image processing application.

After the mask threshold value has been determined at step 94, the routine continues to step 98 to determine whether the particular pair of pixels being compared are similar to one another or different. Step 98 determines the absolute value of the difference between the actual background image pixel and the current image pixel. If the absolute value of the difference is greater than the mask threshold value, then the pixel is identified as a part of the foreground portion of the image and the corresponding mask bit is assigned a value of 1 at step 100. If the absolute value of the difference between the pixels is less than or equal to the mask threshold value, then the current image pixel is considered to be part of the background portion of the image, and the corresponding mask bit is assigned a value 0 at step 102.

After the mask bit value has been assigned at step 100 or 102, the routine continues at step 104 to determine whether the last column has been analyzed. If additional columns of pixels remain to be compared, the routine branches to step 96. If the last column has been compared, then the routine branches to step 106 to increment the row counter and reset the column counter to 0. The routine continues to step 108 to determine whether the last row of pixels has been analyzed. If additional rows of pixels remain to be analyzed, the routine branches to step 96. If all pixel rows have been compared, then the mask creation is complete and the routine terminates. After all pixel rows have been compared, the image mask is complete.

After the image mask has been generated, the image mask is convolved using a convolution procedure different from the procedure used to convolve the actual background image and the current image as described above. The image mask convolution procedure is performed once, rather than twice as described above. Additionally, the calculations used to determine the convolved mask bit are different.

Figure 10:
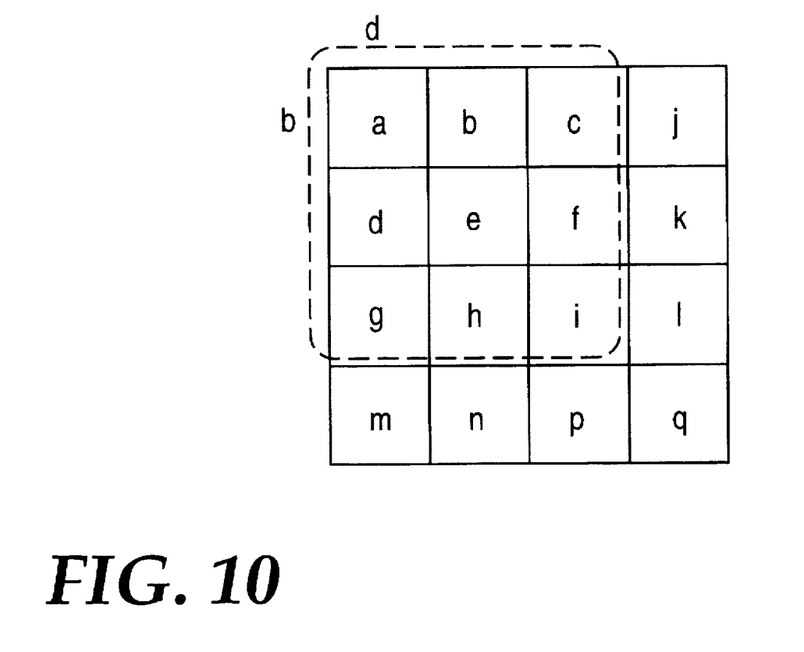
FIG. 10 is a pixel diagram illustrating a convolution procedure used by the image processing system.

Referring to FIG. 10, the sixteen mask bits in the upper left corner of the image mask are shown. To convolve the image mask, the four mask bits immediately adjacent to the mask bit being convolved are added together and divided by four. Mask bits located along the edge of the image mask use the "mirroring" technique to derive the necessary mask bit values. The calculation to convolve mask bit a is as follows:

$$\text{convolved mask bit } a = \frac{d+b+b+d}{4}$$

Similarly, when convolving mask bit e, the immediately adjacent bits b, d, f, and h are added together and divided by four, as illustrated by the following formula:

$$\text{convolved mask bit } e = \frac{b+d+f+h}{4}$$

Dividing by a power of two is performed efficiently in a digital computer system. Therefore, when convolving mask bits, the preferred calculation divides by four rather than five. The image mask convolution procedure only uses the four immediately adjacent mask bit values to provide a less extreme convolution of the image mask. Therefore, a lesser degree of smoothing is performed on the image mask than is performed on the actual background image and current image as described above. However, the image mask convolution is sufficient to produce a gray scale image mask and provide a transition region between the foreground image and the replacement background image. Without this image mask convolution, the edges between the foreground image and the replacement background image may be extreme and noticeable. The convolution process provides a gradual region for blending the two images to eliminate any extreme edges.

Figure 11:
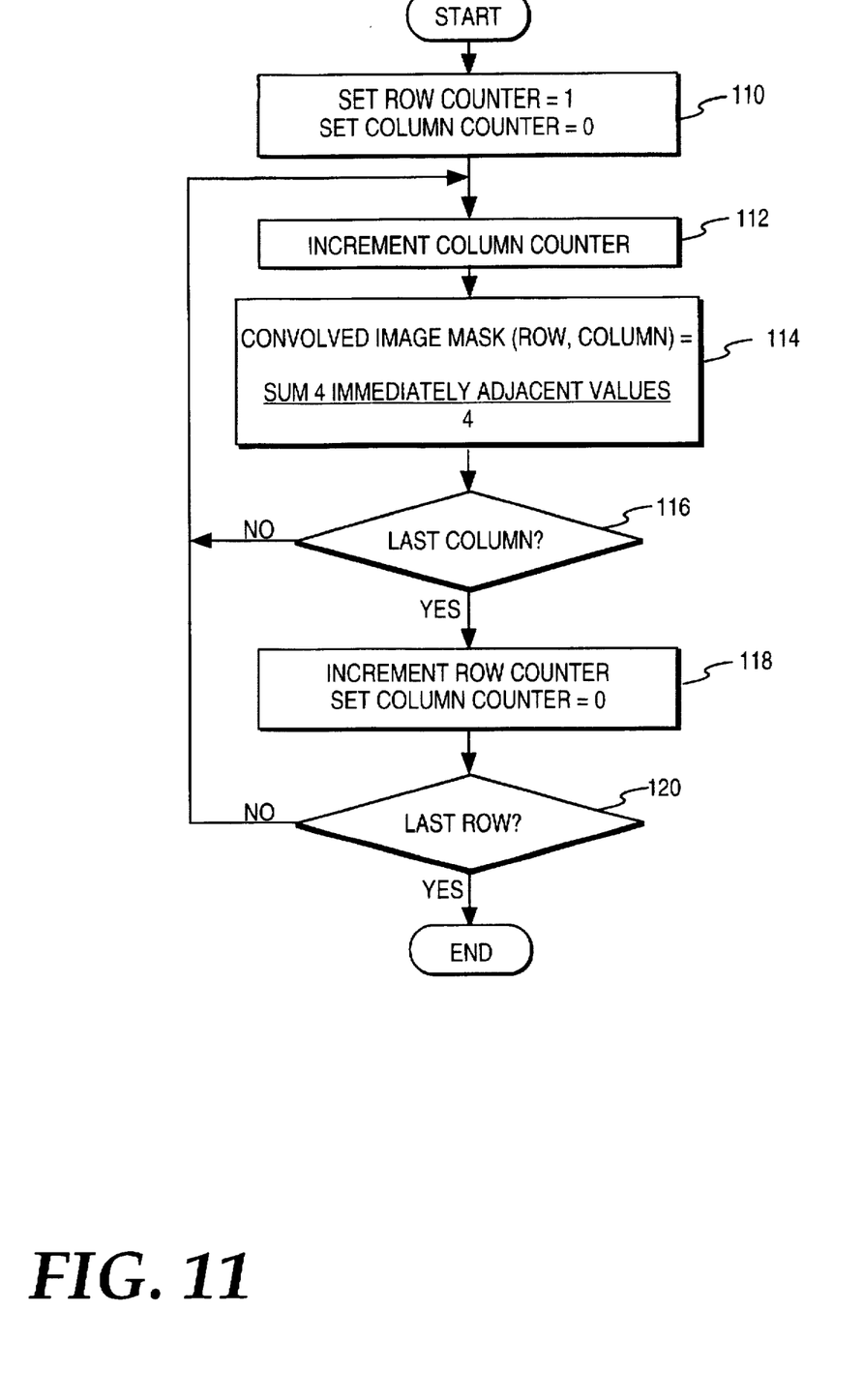
FIG. 11 is a flow diagram illustrating an image mask convolution process.

Referring to FIG. 11, a flow diagram illustrates the image mask convolution procedure. At step 110, the row counter is set to 1 and the column counter is set to 0. The column counter is incremented at step 112 and the convolved image mask value is determined at step 114. The convolved image mask value is determined by adding the four immediately adjacent mask bit values and dividing by four. As discussed above, "mirroring" is used for mask bits located along the edge of the image mask. This convolved image mask value is stored in the convolved image mask.

At step 116, the routine determines whether the last mask bit column has been convolved. If additional columns remain, the routine branches to step 112, otherwise the routine branches to step 118 where the row counter is incremented and the column counter is set to 0. At step 120, the routine determines whether the last mask bit row has been convolved. If additional mask bit rows remain, the routine branches to step 112, otherwise the mask convolution routine terminates. At this point, a convolved image mask has been created, and the background replacement procedure can be performed.

As mentioned above, those skilled in the art will appreciate that other image mask convolution methods may be used to practice the present invention. The method described above in FIGS. 10 and 11 represents one example of an image mask convolution procedure.

Figure 12:
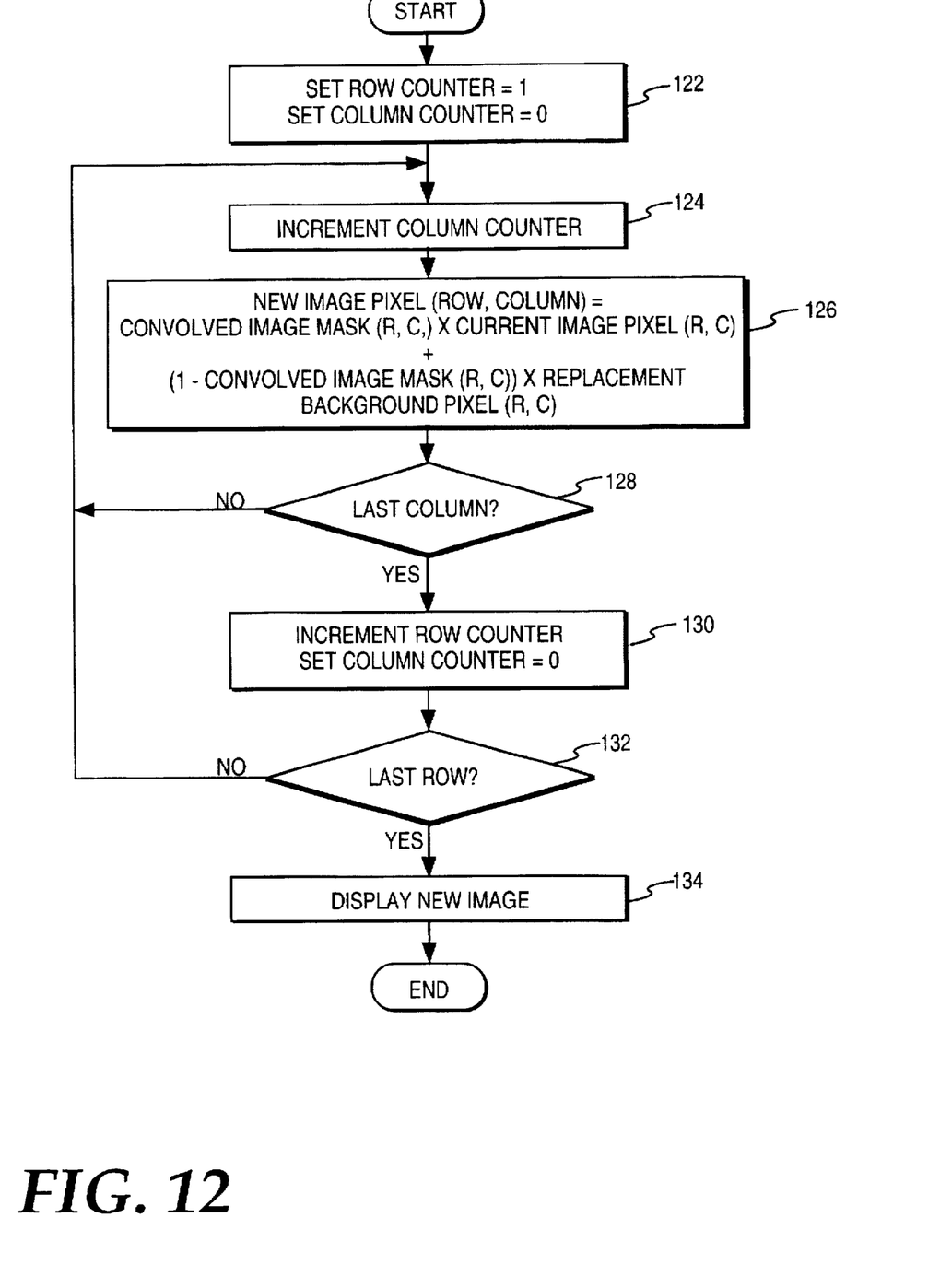
FIG. 12 is a flow diagram showing the operations performed to accomplish a background replacement.

Referring to FIG. 12, a flow diagram illustrates the procedure followed to perform the background replacement. Background replacement is accomplished by applying the convolved image mask to both the current image and the replacement background image to create a new image containing the replacement background. At step 122, the row counter is set to 1 and the column counter is set to 0. At step 124 the column counter is incremented, and at step 126 the value of the pixel in the new image is determined. To determine the new image pixel value, the value of the convolved image mask is multiplied by the corresponding pixel value in the current image and added to the inverse of the convolved image mask value multiplied by the corresponding pixel in the replacement background. Thus, if the convolved image mask value is 1, the pixel value of the current image will be used as the new image pixel. Similarly, if the convolved image mask value is 0, the pixel value from the replacement background will be used as the new image pixel. If the convolved image mask value is between 0 and 1, a portion of the current image value will be added to a portion of the replacement background value to determine the new image pixel value. This procedure selects the replacement background whenever a similarity was found between the actual background image and the current image. The current image is selected in the new image whenever a difference was located between the actual background image and the current image. Thus, only the foreground portion of the current image is used in the new image. The remaining portion of the new image is selected from the replacement background image.

Referring again to FIG. 12, after calculating the new image pixel value at step 126, the routine continues to step 128 to determine whether all columns have been analyzed. If any columns remain to be analyzed, the routine branches to step 124, otherwise the routine branches to step 130 where the row counter is incremented and the column counter is set to 0. At step 132, the routine determines whether all rows of the images have been analyzed. If any rows remain to be analyzed, the routine branches to step 124, otherwise the routine branches to step 134 where the new image is displayed.

At this point, background replacement processing of the current image is complete, and another image may be sampled. To sample another image, the overall image processing routine illustrated in FIG. 4 may return to step 60 to sample another image and perform steps 60–70 to convolve the current image, generate and convolve an image mask, and generate another new image.

In an alternate embodiment of the present invention, the image processing system removes the background portion of an image, but does not add a replacement background. This procedure generally follows the steps described above with respect to background replacement. However, the portions of the image identified as the background by the image mask are represented as black regions in the new image. Alternatively, the background may be represented as gray or any other desired color.

In another embodiment of the present invention, the image processing system may be utilized to identify items missing from the current image which were present in the actual background image. Since the image mask identifies differences between the actual background image and the current image, and difference between the two images can be identified, including the removal of items. For example, if the books on the desk in FIG. 5A (actual background image) were missing in FIG. 5B (current image) the missing books will be identified in the image mask as a difference between the images. Therefore, the missing books may become part of the foreground portion of the image.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for replacing a background portion of an image with a replacement background image, said method comprising the steps of:

receiving an actual background image;

receiving a current image having a background portion;

generating an image mask representing similarities and differences between said actual background image and said current image; and generating a new image containing portions of said current image and portions of said replacement background image responsive to said image mask.

2. The method of claim 1 further including the step of generating said replacement background image prior to receiving said actual background image.

3. The method of claim 1 further including the step of convolving said actual background image to generate a convolved actual background image.

4. The method of claim 1 further including the step of convolving said current image to generate a convolved current image.

5. The method of claim 1 further including the step of convolving said image mask to generate a convolved image mask.

6. The method of claim 1 further including the step of storing said actual background image after receiving said actual background image.

7. The method of claim 1 further including the step of storing said replacement background image.

8. The method of claim 1 further including the step of displaying said new image.

9. The method of claim 1 further including the step of storing said new image.

10. The method of claim 1 wherein said step of generating an image mask includes determining a mask threshold value for comparing said actual background image and said current image.

11. The method of claim 1 wherein said step of generating a new image includes applying said image mask simultaneously to said current image and said replacement background image.

12. The method of claim 1 further including the step of generating a series of individual background images utilized in a predetermined order to generate said replacement background image.

13. The method of claim 1, wherein said background portion of said current image includes at least a portion of said actual background.

14. A method for removing a background portion of an image, said method comprising the steps of:

receiving an actual background image;

receiving a current image having a foreground portion and a background portion;

generating an image mask representing similarities and differences between said actual background image and said current image; and generating a new image containing only said foreground portion of said current image responsive to said image mask.

15. The method of claim 14 further including the step of convolving said actual background image to generate a convolved actual background image.

16. The method of claim 14 further including the step of convolving said current image to generate a convolved current image.

17. The method of claim 14 further including the step of convolving said image mask to generate a convolved image mask.

18. The method of claim 14 wherein said step of generating an image mask includes determining a mask threshold value for comparing said actual background image and said current image.

19. The method of claim 14 wherein said step of generating a new image includes applying said image mask to said current image.

20. The method of claim 14, wherein said background portion of said current image includes at least a portion of said actual background image.

21. An image processing system for replacing a background portion of an image with replacement background image, said image processing system comprising:

means for receiving an actual background image;

an image capture device for capturing a current image having a background portion;

means for generating an image mask representing similarities and differences between said actual background image and said current image; and means for generating a new image containing portions of said current image and portions of said replacement background image responsive to said image mask.

22. The image processing system of claim 21, wherein said background portion of said current image includes at least a portion of said actual background image.

23. An image processing apparatus for replacing a background portion of an image with a replacement background image, said image processing apparatus comprising:

a camera;

an image capture device coupled to said camera, said image capture device configured to capture a current image;

a processing system coupled to said image capture device, said processing system configured to generate an image mask representing similarities and differences between an actual background image and said current image; and an image generator coupled to said processing system, said image generator configured to create a new image containing portions of said current image and portions of said replacement background image responsive to said image mask.

* * * * *